No. 645,065. Patented Mar. 13, 1900.
A. A. BROWN.
DRIVING MECHANISM FOR BICYCLES.
(Application filed July 31, 1899.)
(No Model.) 2 Sheets—Sheet 2.
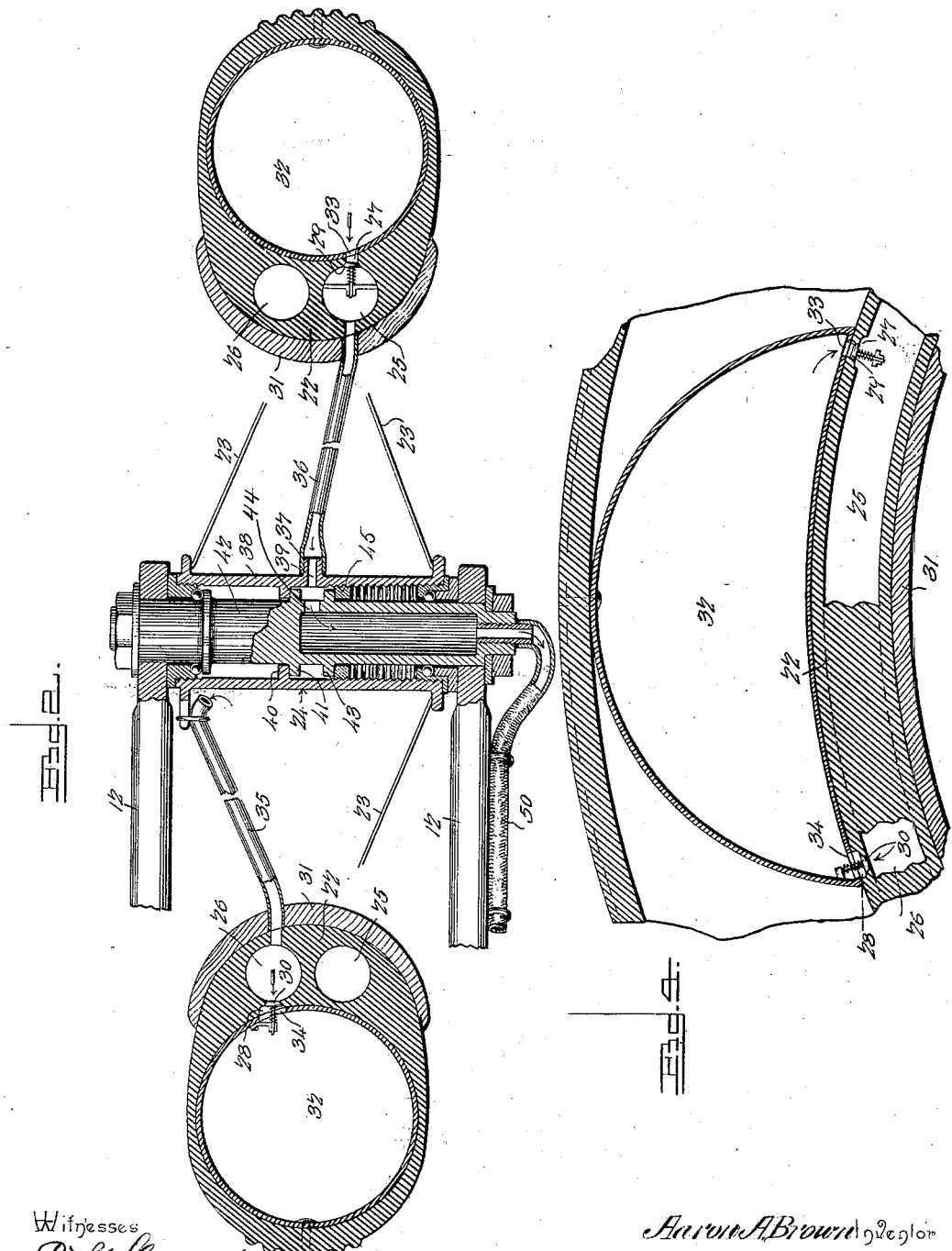

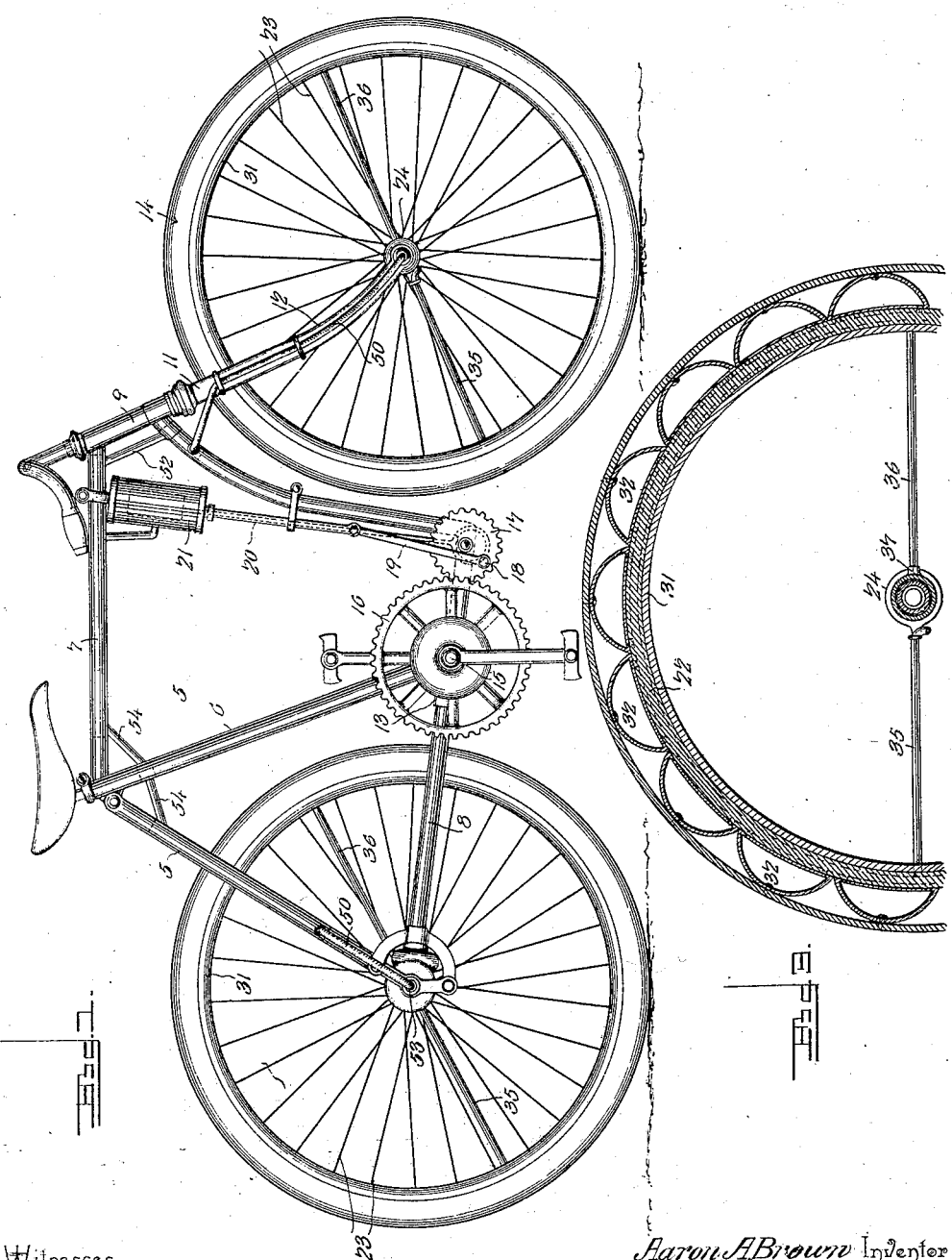

UNITED STATES PATENT OFFICE.

AARON AUGUST BROWN, OF RAWLINS, WYOMING.

DRIVING MECHANISM FOR BICYCLES.

SPECIFICATION forming part of Letters Patent No. 645,065, dated March 13, 1900.

Application filed July 31, 1899. Serial No. 725,659. (No model.)

*To all whom it may concern:*

Be it known that I, AARON AUGUST BROWN, a citizen of the United States, residing at Rawlins, in the county of Carbon and State of Wyoming, have invented a new and useful Driving Mechanism for Bicycles and other Vehicles, of which the following is a specification.

This invention relates to driving mechanism for bicycles and other vehicles; and it has for one object to provide means for utilization of energy derived from the compression of the tires of the bicycle.

A further object of the invention is to provide a construction of frame to especially accommodate the driving mechanism in question and also to provide means for conducting the energy derived from the tires to the translating medium carried by the bicycle-frame.

In the drawings forming a portion of this specification, and in which like numerals of reference indicate similar parts in the several views, Figure 1 is a side elevation of a bicycle equipped with driving mechanism in accordance with this invention. Fig. 2 is a transverse section of a bicycle-wheel, taken through its axis, the adjacent portions of the frame of a bicycle being shown in elevation. Fig. 3 is a vertical section of a wheel embodying the invention, which section is taken at right angles to the axis of the wheel. Fig. 4 is a detail section of a portion of the tire and showing the form and arrangement of a compression-chamber.

Referring now to the drawings, in operating in accordance with this invention there is formed a bicycle-frame comprising rear forks 5, seat-tube 6, top bar 7, and tie-rods 8, of the usual construction, and to the forward end of which top bar is fixed a head 9, in which is journaled a stem carrying at one end the handle-bars and at the other end a fork-crown 11, to which are fixed the fork sides 12, as is usual. That portion of the frame corresponding to the bottom bar in a diamond-frame machine is continued outwardly and forwardly from the crank-hanger 13 of the frame to a point adjacent the front wheel 14, mounted in the front forks, from which point the bottom bar is extended upwardly to the head 9 and substantially parallel with the adjacent periphery of the front wheel.

The crank-axle 15 of the machine is provided with the usual cranks and pedals and with any desired form of power-transmitting mechanism between the crank-axle and the rear wheel, in this instance there being shown what is known as the "chainless" bicycle.

Mounted upon the crank-axle 13 is a gear 16, meshing with a pinion 17 upon the forwardly-extending portion of the bottom bar of the bicycle-frame, and which pinion carries a crank-pin 18, with which is connected a pitman 19, connected with the piston-rod 20, extending from the cylinder 21 of an engine supported upon the top bar 7 of the frame. The cylinder 21 has the usual valve mechanism and is provided with a feed-pipe, as shown, which has direct communication with the top bar 7 of the bicycle-frame.

Air-pressure for operating the engine above described is secured from the tires of the two wheels of the bicycle, the pressure from which wheels is conducted to the bicycle-frame and thence to the cylinder of the engine.

Referring now more particularly to Figs. 2, 3, and 4 of the drawings, in order to secure the energy necessary for the operation of the engine each wheel of the bicycle consists of a felly 31, connected through the medium of spokes 23 with a hub 24. Mounted in the felly 31 is a tire of rubber or other suitable resilient material comprising a base portion 22, having formed therein two annular passages 25 and 26 side by side and lying entirely within said base portion. Opening into the inclosure of the tire, which is of tubular form, are perforations 27 and 28, communicating with the passages 25 and 26, the perforations 27 having valves 29 opening in the direction of the passage 25, while the perforations 28 have valves 30 opening outwardly from the passage 26 and into the inclosure of the tire. Within the inclosure of the tire is arranged a plurality of compression-chambers 32, of rubber or other flexible material, and which chambers are substantially semicircular in longitudinal section, the comparatively-flat sides or bases of said chambers being disposed against the inner face of the base 22 of the tire, openings 33 and 34 in the said flat sides being arranged to aline with their corresponding openings 27 and 28, respectively, whereby communication between each chamber and the passages 25 and 26 is secured. The compression-chambers 32 are arranged end to end within the inclosure of the tire, and thus as the wheel is rotated in practice the weight of the rider will actuate the chambers successively, acting to compress them and to discharge the air therefrom and into the passage 25. Moreover, as the chambers successively pass from the influence of the weight upon the wheels of the machine the elasticity of the tire and of the material of which the chambers are formed will cause such chambers to successively expand, and thus to draw a fresh supply of air from the passage 26, an air-supply pipe 35 being connected at one end with the passage 26, and leading inwardly and radially of the wheel to a point adjacent to the hub thereof in order that the inlet end of said tube may be as far as possible from the tread of the wheel, and thus take in a minimum of dust.

In order to conduct the air under pressure from the passage 25 to the frame of the machine, an air-supply tube 36 is passed through the felly 31 and opens into the passage 25, the opposite end of said tube being connected with a nipple 37 upon a hub 38 of the wheel, and through which nipple is formed a perforation 39, opening into the bore of the hub. At one side of this perforation 39 is formed an inwardly-directed annular flange 40, adapted to lie against a similar flange 41 upon the outer surface of an axle 42, passed through the hub. A second similar flange 43 is formed upon the axle at the opposite side of the perforation 39, resulting in the formation of an annular groove about the periphery of the axle. Opening from this groove into the bore of the axle, one end of which latter is hollow, as shown, is the perforation 44, whereby direct communication between the passage 25 and the bore of the axle is secured. The adjacent inner face of the hub 24 is screw-threaded, as shown, and in engagement with which threads is a ring 45, adapted to bear upon the outer face of the flange 43, and thus hold the flanges 40 and 41 in close contact. Suitable ball-bearings are arranged between the hub 24 and the axle 42 of any desired style, and thus it will be seen that as the wheel is rotated the perforation 39 will be in constant communication with the adjacent annular groove of the axle, and hence in constant communication with the bore of the axle.

The ends of the axle 42 are threaded in the usual manner for the reception of clamping-nuts, which hold the axle fixedly with respect to the fork sides 12 of the bicycle-frame. A flexible tube 50, having a metallic end, is screwed upon the tubular end of the shaft 42 and is extended upwardly along one of the fork sides 12, and thence to the curved portion of the bottom bar, with which it is in communication. The ends of the top and bottom bars are hermetically sealed, communication therebetween being secured through the medium of a tubular connection 52, and thus may the air under pressure in the front wheel enter the top bar of the bicycle-frame and be conducted from thence to the cylinder of the engine to drive the piston.

It is of course understood that the construction of the rear wheel of the bicycle is identical with that just described. The rear axle 53 has a rigid connection with one of the sides of the rear fork 5, which in turn has a tubular connection 54 with the top bar 7.

Thus in practice the bicycle may be driven through the medium of its usual driving mechanism, when the rotation of the wheels thereof will cause the successive compression of the compression-chambers, with the result that the air therefrom is forced through the passages 27 and supply-pipes 36 to the frame of the bicycle, and thence to the cylinder of the engine, exerting pressure upon the piston within the cylinder, which piston will be reciprocated to rotate the pinion 17 and therewith the gear 16.

It will of course be understood in practice that this driving mechanism may be applied to a machine having a frame of any style and with little variation of the frame to better accommodate the different parts and also that any specific form of engine may be employed and that the shapes of the compression-chambers, as also the material of which they are formed, may be varied as desired.

What is claimed is—

1. The combination with a vehicle-frame, of a motor carried thereby, and wheels rotatably mounted upon the frame, each of said wheels having a resilient and elastic tire comprising inlet and outlet passages, compression-chambers within the tire and connected with the passages, and connections between the outlet-passages and the motor for delivering energy thereto.

2. The combination with a vehicle-frame, and a motor carried thereby, of a wheel rotatably mounted in the frame, connections between said wheel and motor for communicating motion from one to the other, and an elastic and resilient tire for the wheel comprising a base portion having passages therein, compression-chambers within the tire, valved inlet-openings for the chambers from one of the passages, valved outlet-openings from the chambers to the second passage, and connections between the last-named passage and the motor.

3. A bicycle-tire comprising a thickened base portion, and a tread portion, passages within the thickened portion, openings leading to the passages, a plurality of compression-chambers within the tire, additional openings connecting the passages with each of the compression-chambers, and a valve in each of said last-named openings.

4. A bicycle-tire comprising a thickened base portion and a tread portion, an inlet-passage and an outlet-passage within said base portion, perforations communicating with the inlet-passage and the inclosure of the tire and having valves opening outwardly from the passage, similar valved openings for the outlet-passage, the valves of which open inwardly of the passage, and a plurality of compression-chambers within the tire and having communication with said valved openings.

In testimony that I claim the foregoing as my own I have hereto affixed my signature in the presence of two witnesses.

AARON AUGUST BROWN.

Witnesses:
ERIK BRAND,
J. P. MEALS.